United States Patent [19]

Newman et al.

[11] Patent Number: 6,013,744
[45] Date of Patent: Jan. 11, 2000

[54] SYNDIOTACTIC VINYLIDENE AROMATIC POLYMERIZATION PROCESS

[75] Inventors: Thomas H. Newman, Midland; Karen K. Borodychuk, Mt. Pleasant, both of Mich.; Jürgen Schellenberg, Halle, Germany

[73] Assignee: The Dow Chemical Company, Midland, Mich.

[21] Appl. No.: 09/086,100

[22] Filed: May 28, 1998

Related U.S. Application Data

[60] Provisional application No. 60/017,641.
[51] Int. Cl.$^7$ ........................................... C08F 4/52
[52] U.S. Cl. ........................... 526/128; 526/160; 526/943
[58] Field of Search ..................... 526/128, 160, 526/943

[56] References Cited

U.S. PATENT DOCUMENTS

| | | | |
|---|---|---|---|
| 5,605,990 | 2/1997 | Abiko et al. | 526/128 |
| 5,643,845 | 7/1997 | Tajima et al. | 526/128 |
| 5,644,099 | 7/1997 | Tsai et al. | 526/128 |
| 5,648,428 | 7/1997 | Reddy et al. | 526/116 |

*Primary Examiner*—David W. Wu
*Assistant Examiner*—Caixia Lu-Rutt

[57] ABSTRACT

A process for preparing syndiotactic vinylidene aromatic polymers comprising contacting one or more vinylidene aromatic monomers with a hydrocarbylsilane or di(hydrocarbyl)silane adjuvant to form a monomer/silane mixture and contacting the monomer/silane mixture with a catalyst composition comprising a Group 4 metal complex and an activating cocatalyst.

12 Claims, No Drawings

SYNDIOTACTIC VINYLIDENE AROMATIC POLYMERIZATION PROCESS

CROSS REFERENCE STATEMENT

This application is a CIP of PCT/US97/06428, filed Apr. 17, 1997, which claims the benefit of U.S. Provisional Application No. 60/017,641, filed May 7, 1996.

The present invention relates to a process for polymerizing vinylidene aromatic monomers, such as styrene, to produce polymers having a high degree of syndiotacticity using a catalyst composition comprising a Group 4 metal complex and a catalyst adjuvant. The resulting polymers may be usefully employed in the preparation of solid objects and articles such as a moldings, films, sheets and foamed objects by molding, casting or the like process.

In U.S. Pat. No. 4,680,353 there is disclosed a process for the preparation of polymers of vinylidene aromatic monomers having a stereoregular structure of high syndiotacticity, by the use of Group 4 metal coordination catalysts and an alumoxane cocatalyst.

In U.S. Pat. No. 5,066,741 there are disclosed certain cationic metal compounds formed by reacting a Group 4 metal complex with ammonium or phosphonium salts of Bronsted acids containing a noncoordinating compatible anion or with cationic oxidizers containing a noncoordinating compatible anion. The complexes are usefully employed as catalysts in the polymerization of polymers of vinylidene aromatic monomers having a stereoregular structure of high syndiotacticity.

In U.S. Pat. No. 5,374,696, certain Group 4 metal complexes wherein the metal is in the +3 oxidation state and their use as addition polymerization catalysts are disclosed. For the teachings contained therein, the aforementioned U.S. Patents are herein incorporated in their entirety by reference thereto.

SUMMARY OF THE INVENTION

According to the present invention there is now provided a novel process for preparing polymers of vinylidene aromatic monomers having a high degree of syndiotacticity. The process comprises a) contacting at least one polymerizable vinylidene aromatic monomer with a hydrocarbylsilane or di(hydrocarbyl)silane adjuvant to form a monomer/silane mixture; and b) contacting the monomer/silane mixture, under polymerization conditions, with a catalyst composition comprising:

i) a Group 4 metal complex corresponding to the formula:

wherein:

Cp is a single $\eta^5$-cyclopentadienyl or $\eta^5$-substituted cyclopentadienyl group, the substituted cyclopentadienyl group being optionally also bonded to M through a substituent X;

M is a metal of Group 4 or the Lanthanide Series of the Periodic Table;

X each occurrence is an inert anionic ligand of up to 20 nonhydrogen atoms and optionally X and Cp are joined together;

X' is an inert, neutral donor ligand;

m and p are independently 0 or 1;

n is an integer greater than or equal to 1; and the sum of m and n is equal to the oxidation state of the metal; and ii) an activating cocatalyst.

Compared to polymerization processes utilizing a similar catalyst composition that lacks the aforementioned adjuvant, the present process achieves a significantly improved conversion of monomer and greater efficiency in use, thereby permitting a reduction in the quantity of metal complex employed. In addition, the molecular weight of the resulting product is desirably reduced compared to the polymer molecular weight obtained in the absence of such adjuvant. The advantage is particularly pronounced at reaction temperatures less than 75° C., preferably less than 70° C. In addition, the present adjuvants may be combined with the use of hydrogen to further improve the conversion and reduce the molecular weight of the resulting polymer product. Moreover, the catalyst efficiency and activation is increased with improved conversion of monomer when the adjuvant is added to the monomer rather than combined with the catalyst composition.

DETAILED DESCRIPTION OF THE INVENTION

All reference to the Periodic Table of the Elements herein shall refer to the Periodic Table of the Elements, published and copyrighted by CRC Press, Inc., 1989. Also, any reference to a Group or Series shall be to the Group or Series as reflected in this Periodic Table of the Elements, utilizing the IUPAC system for numbering groups.

As used herein, the term "syndiotactic" refers to polymers having a stereoregular structure of greater than 50 percent syndiotactic of a racemic triad as determined by $^{13}C$ nuclear magnetic resonance spectroscopy. Such polymers may be usefully employed in the preparation of articles and objects (e.g., via compression molding, injection molding or other suitable technique) having an extremely high resistance to deformation due to the effects of temperature.

Preferred adjuvants used in this invention are arylsilanes, substituted arylsilanes, diarylsilanes, substituted diarylsilanes, alkylsilanes and dialkylsilanes. Most preferred adjuvants used herein include diphenylsilane, phenylsilane, octylsilane, butylsilane and mesitylsilane which due to the fact that they are liquids are readily measured and handled in the polymerization process.

With respect to the metal complexes, illustrative but nonlimiting examples of X include hydrocarbyl, silyl, halo, $NR_2$, $PR_2$, OR, SR, and $BR_2$, wherein R is $C_{1-20}$ hydrocarbyl.

Illustrative but nonlimiting examples of X' include ROR, RSR, $NR_3$, $PR_3$, and $C_{2-20}$ olefins or diolefins, wherein R is as previously defined. Such donor ligands are able to form shared electron bonds but not a formal covalent bond with the metal.

Suitable polyalkylalumoxane activating cocatalysts (interchangeably referred to as alumoxanes or aluminoxanes) for use herein especially include methylalumoxane, isopropyl alumoxane, and modified methylalumoxane, i.e. methylalumoxane modified with triisopropyl aluminum. In addition to the alumoxane it is often desirable to additionally include a $C_{1-4}$ trialkyl aluminum compound in the polymerization. Examples include triethyl aluminum, tri n-propyl aluminum, tri isopropyl aluminum, tri n-butyl aluminum, triisobutyl aluminum, and mixtures thereof.

Preferred monocyclopentadienyl and substituted monocyclopentadienyl groups for use according to the present invention are more specifically depicted by the formula:

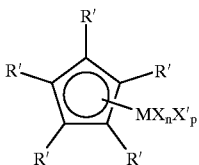

wherein:

M is titanium;

X independently each occurrence is hydrogen, halide, R, or OR;

R is $C_{1-10}$ hydrocarbyl group;

X' is a $C_{4-40}$ conjugated diene;

n is 1, 2 or 3;

p is 1 when n is 1, and p is 0 when n is 2 or 3;

R' each occurrence is independently selected from the group consisting of hydrogen, halogen, R, $NR_2$, $PR_2$; OR; SR or $BR_2$, or one or two pairs of adjacent R' hydrocarbyl groups are joined together forming a fused ring system.

Preferably, the cyclic moiety comprises a cyclopentadienylindenyl-, fluorenyl-, tetrahydrofluorenyl-, or octahydrofluorenyl-group or a $C_{1-6}$ hydrocarbyl substituted derivative thereof, n is three, p is zero, X is $C_{1-4}$ alkyl, $C_{1-4}$ alkoxide, fluoride or chloride. Most highly preferred metal complexes comprise pentamethylcyclopentadienyltitanium trimethyl, pentamethylcyclopentadienyltitanium tribenzyl, pentamethylcyclopentadienyltitanium trimethoxide, octahydrofluorenyltitanium tribenzyl, octahydrofluorenyltitanium trimethyl, octahydrofluorenyltitanium trimethoxide, pentamethylcyclopentadienyltitanium trichloride, pentamethylcyclopentadienyltitanium trifluoride, octahydrofluorenyltitanium trichloride, octahydrofluorenyltitanium trifluoride, pentamethylcyclopentadienyltitanium mono(trifluoroacetate) difluoride, pentamethylcyclopentadienyltitanium mono(pentafluorobenzoate) difluoride, octahydrofluorenyltitanium mono(trifluoroacetate) difluoride, octahydrofluorenyltitanium mono(pentafluorobenzoate) difluoride.

In a preferred embodiment, the metal complex is a metal trialkoxide or trihalide which is combined with a trialkylaluminum or trialkylboron compound either prior to or simultaneously with the activating cocatalyst to form the active catalyst composition. It is believed, without wishing to be bound by such belief that the trialkylaluminum compound or trialkylboron compound causes the in situ transfer of the alkylgroup to the Group 4 metal complex prior to activation thereof.

The complexes are rendered catalytically active by combination with an activating cocatalyst or by use of an activating technique. Suitable activating cocatalysts for use herein include polymeric or oligomeric alumoxanes, especially methylalumoxane, triisobutyl aluminum modified methylalumoxane, or diisobutylalumoxane; strong Lewis acids, such as $C_{1-30}$ hydrocarbyl substituted Group 13 compounds, especially tri(hydrocarbyl)aluminum- or tri(hydrocarbyl)boron-compounds and halogenated derivatives thereof, having from 1 to 10 carbons in each hydrocarbyl or halogenated hydrocarbyl group, especially tris(pentafluorophenyl)borane; and nonpolymeric, inert, compatible, noncoordinating, ion forming compounds (including the use of such compounds under oxidizing conditions). A suitable activating technique is bulk electrolysis (explained in more detail hereinafter). Combinations of the foregoing activating cocatalysts and techniques may also be employed if desired. The foregoing activating cocatalysts and activating techniques have been previously taught with respect to different metal complexes in the following references: EP-A-277,003, U.S. Pat. No. 5,153,157, U.S. Pat. No. 5,064,802, EP-A-468,651 (equivalent to U.S. Ser. No. 07/547,718), EP-A-520,732 (equivalent to U.S. Ser. No. 07/876,268), and WO93/23412 (equivalent to U.S. Ser. No. 07/884,966 filed May 1, 1992), the teachings of which are hereby incorporated by reference.

Suitable nonpolymeric, inert, compatible, noncoordinating, ion forming compounds useful as cocatalysts in one embodiment of the present invention comprise a cation which is a Bronsted acid capable of donating a proton, and a compatible, noncoordinating, anion, $A^-$. Preferred anions are those containing a single coordination complex comprising a charge-bearing metal or metalloid core which anion is capable of balancing the charge of the active catalyst species (the metal cation) which is formed when the two components are combined. Also, said anion can be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are well known and many, particularly such compounds containing a single boron atom in the anion portion, are available commercially.

Preferably such cocatalysts may be represented by the following general formula:

$$(L^*-H)^+_d A^{d-}$$

wherein:

L* is a neutral Lewis base;

$(L^*-H)^+$ is a Bronsted acid;

$A^{d-}$ is a noncoordinating, compatible anion having a charge of d−, and d is an integer from 1 to 3.

More preferably d is one, that is, $A^{d-}$ is $A^-$.

Highly preferably, $A^-$ corresponds to the formula:

$$[BQ_4]^-$$

wherein:

B is boron in the +3 formal oxidation state; and

Q independently each occurrence is selected from hydride, dialkylamido, halide, alkoxide, aryloxide, hydrocarbyl, halocarbyl, and halosubstituted-hydrocarbyl radicals, said Q having up to 20 carbons with the proviso that in not more than one occurrence is Q halide.

In a more highly preferred embodiment, Q is a fluorinated $C_{1-20}$ hydrocarbyl group, most preferably, a fluorinated aryl group, especially, pentafluorophenyl.

Illustrative, but not limiting, examples of ion forming compounds comprising proton donatable cations which may be used as activating cocatalysts in the preparation of the catalysts of this invention are tri-substituted ammonium salts such as:

trimethylammonium tetraphenylborate,
methyldioctadecylammonium tetraphenylborate,
triethylammonium tetraphenylborate,
tripropylammonium tetraphenylborate,
tri(n-butyl)ammonium tetraphenylborate,
methyltetradecyloctadecylammonium tetraphenylborate,
N,N-dimethylanilinium tetraphenylborate,
N,N-diethylanilinium tetraphenylborate,
N,N-dimethyl(2,4,6-trimethylanilinium) tetraphenylborate,
trimethylammonium tetrakis(pentafluorophenyl)borate,
methylditetradecylammonium tetrakis(pentafluorophenyl)borate,
methyldioctadecylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl(2,4,6-trimethylanilinium) tetrakis(pentafluorophenyl)borate,
trimethylammonium tetrakis(2,3,4,6-tetrafluorophenyl)borate,
triethylammonium tetrakis(2,3,4,6-tetrafluorophenyl)borate,
tripropylammonium tetrakis(2,3,4,6-tetrafluorophenyl)borate,
tri(n-butyl)ammonium tetrakis(2,3,4,6-tetrafluorophenyl)borate,
dimethyl(t-butyl)ammonium tetrakis(2,3,4,6-tetrafluorophenyl)borate,
N,N-dimethylanilinium tetrakis(2,3,4,6-tetrafluorophenyl)borate,
N,N-diethylanilinium tetrakis(2,3,4,6-tetrafluorophenyl)borate, and
N,N-dimethyl-(2,4,6-trimethylanilinium) tetrakis-(2,3,4,6-tetrafluorophenyl)borate.

Dialkyl ammonium salts such as:

dioctadecylammonium tetrakis(pentafluorophenyl)borate,
ditetradecylammonium tetrakis(pentafluorophenyl)borate, and
dicyclohexylammonium tetrakis(pentafluorophenyl)borate.

Tri-substituted phosphonium salts such as:

triphenylphosphonium tetrakis(pentafluorophenyl)borate,
methyldioctadecylphosphonium tetrakis(pentafluorophenyl)borate, and
tri(2,6-dimethylphenyl)phosphonium tetrakis(pentafluorophenyl)borate.

Preferred are tetrakis(pentafluorophenyl)borate salts of long chain alkyl mono- and disubstituted ammonium complexes, especially $C_{14}$–$C_{20}$ alkyl ammonium complexes, especially methyldi(octadecyl)ammonium tetrakis(pentafluorophenyl)borate and methyldi(tetradecyl)ammonium tetrakis(pentafluorophenyl)borate.

Another suitable ion forming, activating cocatalyst comprises a salt of a cationic oxidizing agent and a noncoordinating, compatible anion represented by the formula:

$$(Ox^{e+})_d(A^{d-})_e$$

wherein:
Ox$^{e+}$ is a cationic oxidizing agent having charge e+;
e is an integer from 1 to 3; and
$A^{d-}$, and d are as previously defined.

Examples of cationic oxidizing agents include: ferrocenium, hydrocarbyl-substituted ferrocenium, Ag$^+$, or Pb$^{+2}$. Preferred embodiments of $A^{d-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion or silylium ion and a noncoordinating, compatible anion represented by the formula:

wherein:
ĉ$^+$ is a $C_{1-20}$ carbenium ion or silylium ion; and
$A^-$ is as previously defined.

A preferred carbenium ion is the trityl cation, that is triphenylcarbenium. A preferred silylium ion is triphenylsilylium.

The foregoing activating technique and ion forming cocatalysts are also preferably used in combination with a tri(hydrocarbyl)aluminum compound having from 1 to 10 carbons in each hydrocarbyl group, an oligomeric or polymeric alumoxane compound, a di(hydrocarbyl)(hydrocarbyloxy)aluminum compound having from 1 to 20 carbons in each hydrocarbyl or hydrocarbyloxy group, or a mixture of the foregoing compounds, if desired. These aluminum compounds are usefully employed for their beneficial ability to scavenge impurities such as oxygen, water, and aldehydes from the polymerization mixture. The molar ratio of aluminum compound to metal complex is preferably from 10,000:1 to 1:1, more preferably from 5000:1 to 10:1, most preferably from 200:1 to 25:1.

Suitable di(hydrocarbyl)(hydrocarbyloxy)aluminum compounds correspond to the formula $T^1{}_2AlOT^2$ wherein $T^1$ is $C_{3-6}$ secondary or tertiary alkyl, most preferably isopropyl, isobutyl or tert-butyl; and $T^2$ is a $C_{12-30}$ alkaryl radical or aralkyl radical, most preferably, 2,6-di(t-butyl)-4-methylphenyl, 2,6-di(t-butyl)-4-methyltolyl, 2,6-di(i-butyl)-4-methylphenyl, or 4-(3',5'-ditertiarybutyltolyl)-2,6-ditertiarybutylphenyl.

Preferred aluminum compounds include $C_{2-6}$ trialkyl aluminum compounds, especially those wherein the alkyl groups are ethyl, propyl, isopropyl, n-butyl, isobutyl, pentyl, neopentyl, or isopentyl, dialkyl(aryloxy)aluminum compounds containing from 1–6 carbons in the alkyl group and from 6 to 18 carbons in the aryl group (especially (3,5-di(t-butyl)-4-methylphenoxy)diisobutylaluminum), methylalumoxane, modified methylalumoxane and diisobutylalumoxane.

An especially preferred activating cocatalyst comprises the combination of a trialkyl aluminum compound having from 1 to 4 carbons in each alkyl group and an ammonium salt of tetrakis(pentafluorophenyl)borate, in a molar ratio from 50:1 to 5:1, or the combination of such a trialkyl aluminum compound with up to 1000 mole percent (based on M) of an alkylalumoxane, or both of the foregoing combinations.

The activating technique of bulk electrolysis involves the electrochemical oxidation of the metal complex under electrolysis conditions in the presence of a supporting electrolyte comprising a noncoordinating, inert anion. In the technique, solvents, supporting electrolytes and electrolytic potentials for the electrolysis are used such that electrolysis byproducts that would render the metal complex catalytically inactive are not substantially formed during the reaction. More particularly, suitable solvents are materials that are: liquids under the conditions of the electrolysis (generally temperatures from 0 to 100° C.), capable of dissolving the supporting electrolyte, and inert. "Inert solvents" are those that are not reduced or oxidized under the reaction conditions employed for the electrolysis. It is generally possible in view of the desired electrolysis reaction to choose a solvent and a supporting electrolyte that are unaffected by the electrical potential used for the desired electrolysis. Preferred solvents include difluorobenzene (all isomers), DME, and mixtures thereof.

The electrolysis may be conducted in a standard electrolytic cell containing an anode and cathode (also referred to as the working electrode and counter electrode respectively). Suitably materials of construction for the cell are glass, plastic, ceramic and glass coated metal. The electrodes are prepared from inert conductive materials, by which are meant conductive materials that are unaffected by the reaction mixture or reaction conditions. Platinum or palladium are preferred inert conductive materials. Normally, an ion permeable membrane such as a fine glass frit separates the cell into separate compartments, the working electrode compartment and counter electrode compartment. The working electrode is immersed in a reaction medium comprising the metal complex to be activated, solvent, supporting electrolyte, and any other materials desired for moderating the electrolysis or stabilizing the resulting complex. The counter electrode is immersed in a mixture of the solvent and supporting electrolyte. The desired voltage may be determined by theoretical calculations or experimentally by sweeping the cell using a reference electrode such as a silver electrode immersed in the cell electrolyte. The background cell current, the current draw in the absence of the desired electrolysis, is also determined. The electrolysis is completed when the current drops from the desired level to the background level. In this manner, complete conversion of the initial metal complex can be easily detected.

Suitable supporting electrolytes are salts comprising a cation and an inert, compatible, noncoordinating anion, A⁻. Preferred supporting electrolytes are salts corresponding to the formula: G⁺A⁻;
wherein:
G⁺ is a cation which is nonreactive towards the starting and resulting complex, and
A⁻ is a noncoordinating, compatible anion.

Examples of cations, G⁺, include tetrahydrocarbyl substituted ammonium or phosphonium cations having up to 40 nonhydrogen atoms. A preferred cation is the tetra-n-butylammonium cation.

During activation of the complexes of the present invention by bulk electrolysis the cation of the supporting electrolyte passes to the counter electrode and A⁻ migrates to the working electrode to become the anion of the resulting oxidized product. Either the solvent or the cation of the supporting electrolyte is reduced at the counter electrode in equal molar quantity with the amount of oxidized metal complex formed at the working electrode.

Preferred supporting electrolytes are tetrahydrocarbylammonium salts of tetrakis(perfluoroaryl) borates having from 1 to 10 carbons in each hydrocarbyl group, especially tetra-n-butylammonium tetrakis(pentafluorophenyl) borate.

In general, the active catalyst can be prepared by combining the metal complex and activator in a suitable solvent at a temperature within the range from about −100° C. to about 300° C. The catalyst composition may be separately prepared prior to addition of the monomers to be polymerized or prepared in situ by combination of the various components in the presence of the monomers to be polymerized. The catalysts' components are sensitive to both moisture and oxygen and should be handled and transferred in an inert atmosphere.

Suitable solvents or diluents for the catalyst preparation and for the polymerization include any of the solvents known in the prior art including, but not necessarily limited to, straight and branched-chain hydrocarbons such as $C_{6-12}$ alkanes (pentane, hexane, heptane, octane and mixtures thereof); $C_{6-12}$ cyclic and alicyclic hydrocarbons such as cyclohexane, cycloheptane, methylcyclohexane, methylcycloheptane and mixtures thereof and $C_{6-12}$ aromatic and alkyl-substituted aromatic compounds such as benzene, toluene, xylene, decalin, and mixtures thereof, as well as mixtures of the foregoing compounds.

The catalysts may be employed as homogeneous catalysts or supported on the surface of a suitable support such as alumina, silica or a polymer.

In the practice of the present invention, suitable vinylidene aromatic monomers include those represented by the formula:

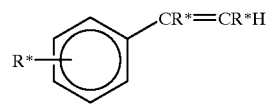

wherein each R* is independently hydrogen; a $C_1$–$C_{10}$ aliphatic, $C_2$–$C_{10}$ olefinic, $C_3$ to $C_{10}$ cycloaliphatic or aromatic hydrocarbon group; or a halogen atom. Examples of such monomers include, styrene, chlorostyrene, n-butylstyrene, p-vinyltoluene, and α-methylstyrene, with styrene being especially suitable. Copolymers of styrene and the above vinylidene aromatic monomers other than styrene can also be prepared.

The silane adjuvant is combined with the monomer to form a monomer/silane mixture prior to the addition of catalyst. The monomer/silane mixture is then contacted with the catalyst composition and remaining components under polymerization conditions.

The polymerization may be conducted under slurry, bulk or suspension polymerization conditions or other suitable reaction conditions including solid, powdered reaction conditions. The polymerization can be conducted at temperatures of from 0° C. to 160° C., preferably from 25° C. to 100° C., more preferably from 30° C. to 80° C., for a time sufficient to produce the desired polymer. Typical reaction times are from one minute to 100 hours, preferably from 1 to 10 hours. The optimum reaction time or reactor residence time will vary depending upon the temperature, solvent and other reaction conditions employed. The polymerization can be conducted at subatmospheric pressure as well as superatmospheric pressure, suitably at a pressure within the range of 1 to 500 psig (6.9 kPa–3,400 kPa). The use of ambient or low pressures, e.g., 1–5 psig (6.9–34.5 kPa) is preferred in view of lower capital and equipment costs.

The polymerization may be conducted in the presence of an inert diluent or solvent or in the absence thereof, i.e., in the presence of excess monomer. Examples of suitable diluents or solvents include $C_{6-20}$ aliphatic, cycloaliphatic, aromatic and halogenated aliphatic or aromatic hydrocarbons, as well as mixtures thereof. Preferred diluents comprise the $C_{6-10}$ alkanes, toluene and mixtures thereof. A particularly desirable diluent for the polymerization is isooctane, iso-nonane or blends thereof such as Isopar-E™, available from Exxon Chemical Company. Suitable amounts of solvent are employed to provide a monomer concentration from 5 percent to 100 percent by weight.

The molar ratio of the vinylidene aromatic monomer to catalyst (in terms of M) may range from 100:1 to $1 \times 10^{10}$:1, preferably from 1000:1 to $1 \times 10^6$:1.

As in other similar polymerizations, it is highly desirable that the monomers and solvents employed be of sufficiently high purity that catalyst deactivation does not occur. Any suitable technique for monomer purification such as devolatilization at reduced pressures, contacting with molecular sieves or high surface area alumina, deaeration, or a combination thereof may be employed.

Purification of the resulting polymer to remove entrained catalyst and cocatalyst may also be desired by the practitioner. Such contaminants may generally be identified by residues of ash on pyrolysis of the polymer that are attributable to catalyst or cocatalyst metal values. A suitable technique for removing such compounds is by solvent extraction, e.g., extraction utilizing hot, high boiling chlorinated solvents, acids or bases such as caustic followed by filtration.

Having described the invention, the following examples are provided as further illustrative and are not to be construed as limiting. The skilled artisan will appreciate that the invention disclosed herein may be practiced in the absence of any component which has not been specifically disclosed. Unless stated to the contrary, all parts and percentages are based on weight.

EXAMPLES 1–6

All reactions and manipulations were carried out under inert atmosphere in a dry box. Styrene monomer is purified by removing oxygen, passing through activated alumina, and hydrogenation using Pd on alumina to remove phenylacetylene. Solvent is purified by sparging with $N_2$ and passing through activated alumina and handled using standard inert atmosphere techniques. Catalyst solutions are prepared in volumetric flasks using toluene solvent. The required amount of pentamethylcyclopentadienyltitanium trimethoxide (Cp*Ti(OCH$_3$)$_3$) is weighed and added to the flask and toluene then added to form a 0.03 M solution.

A catalyst premix is prepared by combining 1.5 mL of a 1.5 M toluene solution of polymethylalumoxane (MAO), 750 µL of a 1 M toluene solution of triisobutylaluminum, 1000 µL of the pentamethylcyclopentadienyltitanium trimethoxide solution, and sufficient toluene to make 10 mL total volume.

Polymerizations are carried out in septum capped, crimp sealed ampoules. The ampoules are charged with 5 ml of styrene. Varying quantities of phenylsilane (1 M in toluene) are added by microliter syringe. Hydrogen is added to some of the ampoules by injecting 1210 µL via a gas tight syringe. The ampoules are equilibrated at 50° C. or 70° C. in a water bath and 42 µL of the catalyst premix is added. After 30 minutes reaction time the polymerization is quenched by the addition of methanol. Each polymer sample is isolated and dried at 150° C. for 30 minutes and then at 250° C. for 30 minutes then weighed in order to determine the percent conversion. Molecular weight of the resulting syndiotactic polymer is determined via standard solution viscometry using atactic polystyrene standards. All polymers have melting points in excess of 260° C. consistent with tacticities of greater than 50 percent based on a racemic triad. Results are shown in Table I.

TABLE I

| Example | Temp. (° C.) | H$_2$ (µL) | Silane:Ti mole ratio | conversion (percent) | Mw × 10$^6$ |
|---|---|---|---|---|---|
| 1 | 50 | 0 | 400 | 46.2 | — |
| 2 | " | 0 | 600 | 49.3 | 1.7 |
| 3 | " | 0 | 800 | 47.2 | — |
| 4 | " | 1210 | 550 | 69.3 | 1.3 |
| 5 | 70 | 0 | 550 | 31.2 | 1.1 |
| 6 | 70 | 1210 | 550 | 42.6 | 0.7 |
| A* | 50 | 0 | 0 | 32.7 | 2.3 |
| B* | " | 0 | 0 | 35.8 | — |
| C* | 70 | 0 | 0 | 28.9 | 1.6 |

The results of the above experiments indicate that the use of the adjuvant allows greatly increased conversion of monomer in the reaction times tested, particularly at 50° C. reaction temperature. In addition the production of lower molecular weight polymers at the same reaction conditions (compare Ex 2 and Comparative A*, or Example 5 and Comparative C*) show a further beneficial property in the catalyst compositions of the invention. That is, even greater reduction of molecular weight and improved conversion is obtained by the combined use of both hydrogen and the silane.

EXAMPLES 7–12

The procedure of Examples 1–6 is followed using a catalyst premix of 3.9 ml of a 1.54 M methylaluminoxane in toluene, 3.0 ml of 1 M triisobutylaluminum in toluene and 3 ml of 0.01 M pentamethylcyclopentadienyltitanium trifluoride or trichloride as indicated in Table II and sufficient additional toluene to reach a 10 ml volume.

Glass ampoules are charged with 10 ml of styrene and the desired amount of phenylsilane. The ampoules are septum capped and crimp sealed and placed in a water bath at 50° C. for 10 minutes. Polymerization is initiated by addition of 125 µl of 0.003 M catalyst premix solution described above and quenched after the desired time as listed in Table II with methanol.

The resulting polymer is isolated and dried under vacuum for 40 minutes at 150° C. and 30 minutes at 250° C. Results are listed in Table II.

| Example | Catalyst Component | silane:Ti molar ratio | Polymerization time (min.) | conversion (percent wt.) |
|---|---|---|---|---|
| 7 | trifluoride | 300:1 | 15 | 51.4 |
| 8 | trifluoride | 300:1 | 30 | 69.6 |
| 9 | trifluoride | 600:1 | 15 | 67.0 |
| 10 | trifluoride | 600:1 | 30 | 83.2 |
| 11 | trichloride | 300:1 | 30 | 42.6 |
| 12 | trichloride | 600:1 | 30 | 50.0 |
| a* | trifluoride | 0 | 15 | 36.9 |
| b* | trifluoride | 0 | 30 | 62.9 |
| c* | trichloride | 0 | 30 | 15.0 |
| d* | trifluoride | 0 | 15 | 36.5 |
| e* | trifluoride | 300:1 | 15 | 17.9 |
| f* | trifluoride | 600:1 | 15 | 17.6 |
| g* | trichloride | 600:1 | 30 | 6.4 |

Comparative examples a*–d* do not contain the silane adjuvant.

Comparative examples e*–g* contain the adjuvant which has been added to the catalyst premix instead of directly to the monomer. The results show the increased conversion with the process of the present invention.

What is claimed is:

1. A process for preparing polymers of vinylidene aromatic monomers having a high degree of syndiotacticity comprising:

a) contacting at least one polymerizable vinylidene aromatic monomer with a monohydrocarbylsilane or di(hydrocarbyl)silane adjuvant to form a monomer/silane mixture prior to the addition of catalyst; and b) contacting the monomer/silane mixture, under polymerization conditions, with a catalyst premix composition comprising:

i) a Group 4 metal complex corresponding to the formula:

CpmMXnX'p wherein:

Cp is a single $\eta^5$-cyclopentadienyl or $\eta^5$-substituted cyclopentadienyl group, the substituted cyclopentadienyl group being optionally also bonded to M through a substituent X;

M is a metal of Group 4 or the Lanthanide Series of the Periodic Table;

X each occurrence is hydrogen, hydrocarbyl, silyl, halo, $NR_2$, $PR_2$, OR, SR, and $BR_2$, wherein R is $C_{1-20}$ hydrocarbyl; and optionally X and Cp are joined together;

X' is an inert, neutral donor ligand;

m and p are independently 0 or 1;

n is an integer greater than or equal to 1; and the sum of m and n is equal to the oxidation state of the metal; and ii) an activating cocatalyst.

2. The process according to claim 1 wherein the vinylidene aromatic monomer is represented by the formula:

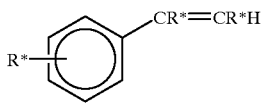

wherein each R* is independently hydrogen; a $C_1$–$C_{10}$ aliphatic, $C_2$–$C_{10}$ olefinic, $C_3$ to $C_{10}$ cycloaliphatic or aromatic hydrocarbon group; or a halogen atom.

3. The process according to claim 2 wherein the vinylidene aromatic monomer is styrene.

4. The process according to claim 1 wherein the Group 4 metal complex corresponds to the formula:

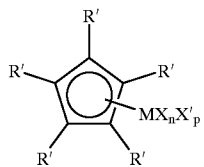

wherein:

M is titanium;

X independently each occurrence is hydrogen, halide, R, or OR;

R is $C_{1-10}$ hydrocarbyl group;

X' is a $C_{4-40}$ conjugated diene;

n is 1, 2 or 3;

p is 1 when n is 1, and p is 0 when n is 2 or 3; and

R' each occurrence is independently selected from the group consisting of hydrogen, halogen, R, $NR_2$, $PR_2$; OR; SR or $BR_2$, or one or two pairs of adjacent R' hydrocarbyl groups are joined together forming a fused ring system.

5. The process according to claim 1 wherein the adjuvant is phenylsilane or diphenylsilane.

6. The process according to claim 1 wherein the adjuvant is octylsilane.

7. The process of claim 1 wherein the catalyst composition comprises:

i) a pentamethylcyclopentadienyltitanium tri($C_{1-4}$) alkoxide or an octahydrofluorenyltitanium tri($C_{1-4}$) alkoxide in combination with a $C_{1-4}$ trialkylaluminum compound; and ii) methylalumoxane.

8. The process of claim 7 wherein the catalyst composition comprises pentamethylcyclopentadienyltitanium trimethoxide.

9. The process of claim 7 wherein the catalyst composition comprises octahydrofluorenyl titanium trimethoxide.

10. The process of claim 1 wherein the catalyst composition comprises:

i) a pentamethylcyclopentadienyltitanium trichloride or trifluoride, or an octahydrofluorenyltitanium trichloride or trifluoride in combination with a $C_{1-4}$ trialkylaluminum compound; and ii) methylalumoxane.

11. The process of claim 10 wherein the catalyst composition comprises pentamethylcyclopentadienyltitanium trifluoride or trichloride.

12. The process of claim 10 wherein the catalyst composition comprises octahydrofluorenyl titanium trifluoride or trichloride.

* * * * *

UNITED STATES PATENT AND TRADEMARK OFFICE
CERTIFICATE OF CORRECTION

PATENT NO. : 6,013,744
DATED : January 11, 2000
INVENTOR(S) : Thomas H. Newman et al.

It is certified that error appears in the above-identified patent and that said Letters Patent is hereby corrected as shown below:

Title Page, column 1, under Assignee section after "The Dow Chemical Company, Midland, Mich." insert--Buna Sow Leuna Olefinverbund GmbH, Schkopau, Fed Rep Germany--.

Title Page, column 1, under Related U.S. Application Data insert--Continuation-in-Part of PCT/US97/06428--.

Signed and Sealed this

Twenty-fourth Day of July, 2001

Attest:

*Nicholas P. Godici*

NICHOLAS P. GODICI
*Attesting Officer*  *Acting Director of the United States Patent and Trademark Office*